United States Patent [19]

Tanaka

[11] Patent Number: 5,617,449
[45] Date of Patent: Apr. 1, 1997

[54] IC MEMORY CARD TYPE RADIO MODEM

[75] Inventor: Masahiko Tanaka, Tokyo, Japan

[73] Assignee: NEC Corporation, Tokyo, Japan

[21] Appl. No.: 493,428

[22] Filed: Jun. 22, 1995

[30] Foreign Application Priority Data

Jun. 27, 1994 [JP] Japan .................................. 6-144425

[51] Int. Cl.⁶ .............................. H04B 1/38; H04M 11/00
[52] U.S. Cl. ........................... 375/222; 379/60; 455/33.2
[58] Field of Search .................................. 375/219, 220, 375/222; 455/33.3, 33.1, 33.2; 379/60, 58, 59

[56] References Cited

U.S. PATENT DOCUMENTS 5,313,211  5/1994  Tokuda et al. ............................ 342/50

FOREIGN PATENT DOCUMENTS

| 0594336A1 | 4/1994 | European Pat. Off. . |
| 621880 | 1/1994 | Japan . |
| 2285558 | 7/1995 | United Kingdom . |
| 9313610 | 7/1993 | WIPO . |
| WO94/21058 | 9/1994 | WIPO . |

*Primary Examiner*—Stephen Chin
*Assistant Examiner*—Kevin Kim
*Attorney, Agent, or Firm*—Whitham, Curtis, Whitham & McGinn

[57] ABSTRACT

An IC memory card type radio modem includes a connecting portion, a radio section, a radio interface unit section, a channel selection circuit section, a terminal interface unit section, and a control section. The connecting portion can be connected to a PC card portion of a portable information processing device. The radio section is adaptable to at least one type of radio infrastructure. The radio interface unit section is adapted to the radio section. The channel selection circuit section is connected to the radio interface unit section. The terminal interface unit section is connected to the channel selection circuit section. The control section controls the plurality of radio sections. The radio interface unit section is controlled to always switch to a radio infrastructure which can perform communication.

2 Claims, 4 Drawing Sheets

IC MEMORY CARD TYPE RADIO MODEM

BACKGROUND OF THE INVENTION

1. Field of the Invention

The present invention relates to an IC memory card type radio modem to be connected to a PC card portion of a personal computer or the like and, more particularly, to an IC memory card type radio modem having a radio section adaptable to at least one type of radio infrastructure.

2. Description of the Prior Art

In conventional techniques, as disclosed in Japanese Unexamined Patent Publication No. 6-21880, communication is performed between a plurality of radio units and different types of radio systems. In the conventional techniques, however, switching between radio units and radio systems is performed in accordance with a judgement made by a user.

Furthermore, some conventional techniques use a plurality of radio sections to allow connection to a plurality of radio infrastructures, thereby allowing communication individually. However, this technique does not allow simultaneous communication upon connection to a plurality of channels.

In performing communication by using a conventional IC memory card type radio modem, a radio infrastructure must be selected in accordance with judgement made by the user of a portable information processing device. Assume that a radio infrastructure in a busy state moves outside a service area, which prevents communication from being sustained. In this case, the communication must be temporarily stopped, and the currently used radio infrastructure must be replaced with another radio infrastructure to resume the communication.

When data is to be sent to a plurality of addresses, the end of transmission of data to one address is confirmed first, and communication to another address is then performed after connection to the radio infrastructure is performed again. This operation must be repeatedly performed. Such re-transmission control leads to a considerable deterioration in information management efficiency.

SUMMARY OF THE INVENTION

The present invention has been made in consideration of the above problems of the conventional techniques, and has as its object to provide an IC memory card type radio modem which allows simultaneous data communication to many remote units and can perform data communication without interference in service areas corresponding to a plurality of radio infrastructures.

In order to achieve the above object, according to the basic aspect of the present invention, there is provided an IC memory card type radio modem comprising a connecting portion which can be connected to a PC card portion of a portable information processing device, a radio section adaptable to at least one type of radio infrastructure, a radio interface unit section adapted to the radio section, a channel selection circuit section connected to the radio interface unit section, a terminal interface unit section to be connected to the channel selection circuit section, and a control section for performing overall control of each constituent block, wherein the radio interface unit section is controlled to always switch a currently used radio infrastructure to a radio infrastructure which can perform communication.

According to an aspect of the present invention, the IC memory card type radio modem further comprises detection means for detecting a reception state. When the detection means determines that communication cannot be continued because the user of the portable information processing device has moved outside a service area, the radio interface unit section is controlled to switch a currently used radio infrastructure to a radio infrastructure which can perform communication.

According to another aspect of the present invention, in the IC memory card type radio modem, simultaneous communication can be performed with respect to a plurality of addresses by performing simultaneous connection to a plurality of channels with respect to the plurality of addresses.

According to the IC memory card type radio modem of the present invention, since the modem includes the radio section adaptable to at least one type of radio infrastructure, simultaneous data communication can be performed by using a plurality of radio sections. This greatly improves the information management efficiency. Even if the user of the portable information processing device moves outside a currently used service area, radio data communication service can be continuously provided without interruption by switching the currently used radio section and performing connection to a different radio infrastructure.

Assume that, for example, in Japan, the user of the portable information processing device subscribes to both operator companies, NTT (Nippon Telegraph and Telephone Corporation) and NCC (New Common Carrier). In this case, since these two operator companies have different service areas, the available service area can be broadened by efficient selective use of the service areas of the two operator companies.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF PREFERRED EMBODIMENT

The present invention will be described in detail below with reference to the preferred embodiment shown in the accompanying drawings.

Figure 1:
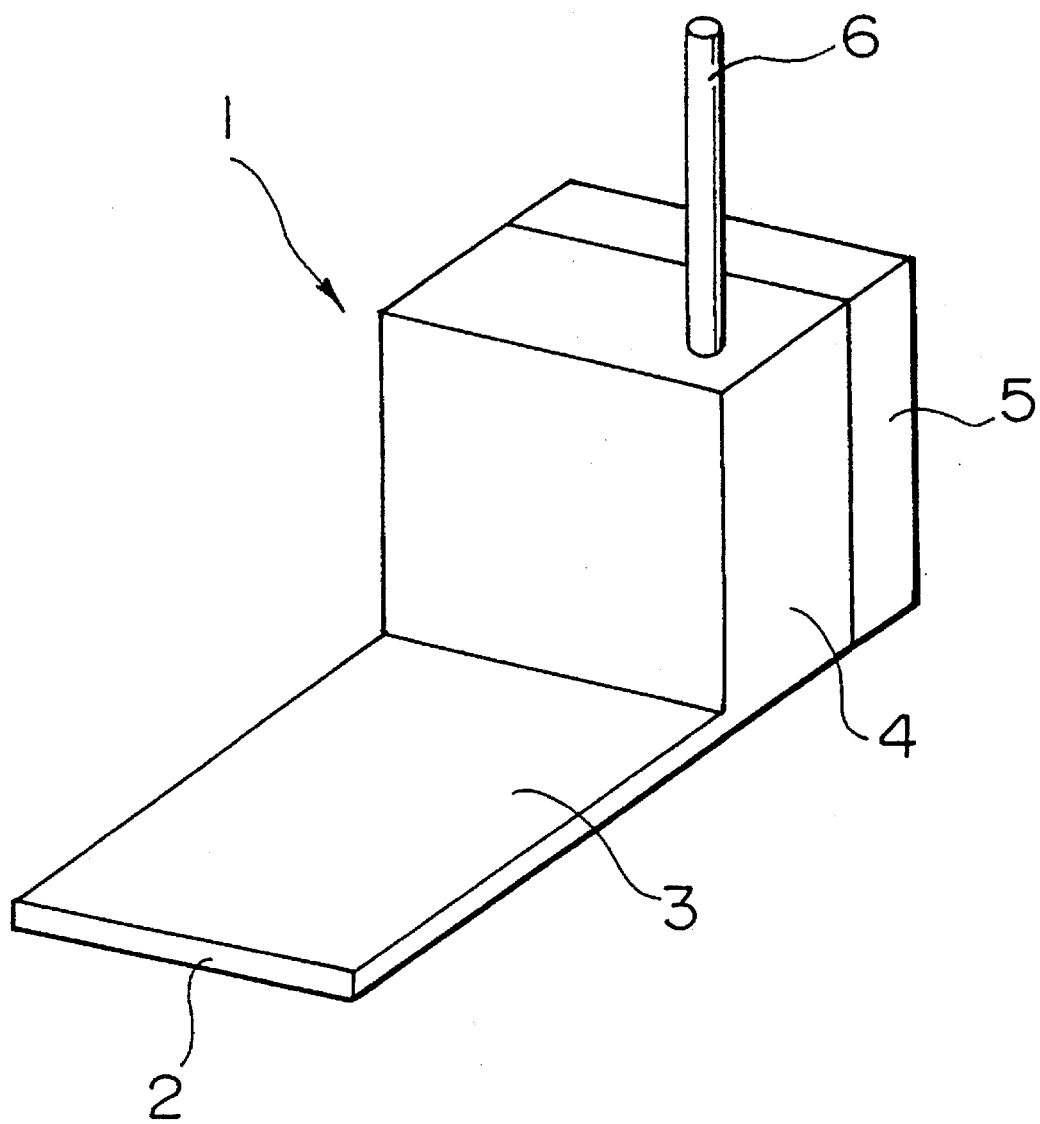
FIG. 1 is a perspective view showing an IC memory card type radio modem according to an embodiment of the present invention.

FIG. 1 shows the outer appearance of an IC memory card type radio modem according to an embodiment of the present invention. As shown in FIG. 1, an IC memory card type radio modem 1 comprises an IC memory card section 3, a main body section 4, a battery pack 5, an antenna 6, and the like.

The IC memory card section 3 is shaped such that it can be directly inserted into card portions of data terminals such as personal computers or various types of terminals. A distal end portion 2 of the IC memory card section 3 serves as a connecting terminal. The battery pack 5 is a power supply for supplying the power required for the operation of the IC memory card type radio modem. The battery pack 5 may be a primary or secondary battery and is detachably mounted.

The main body section 4 will be described next with reference to FIG. 2.

Figure 2:
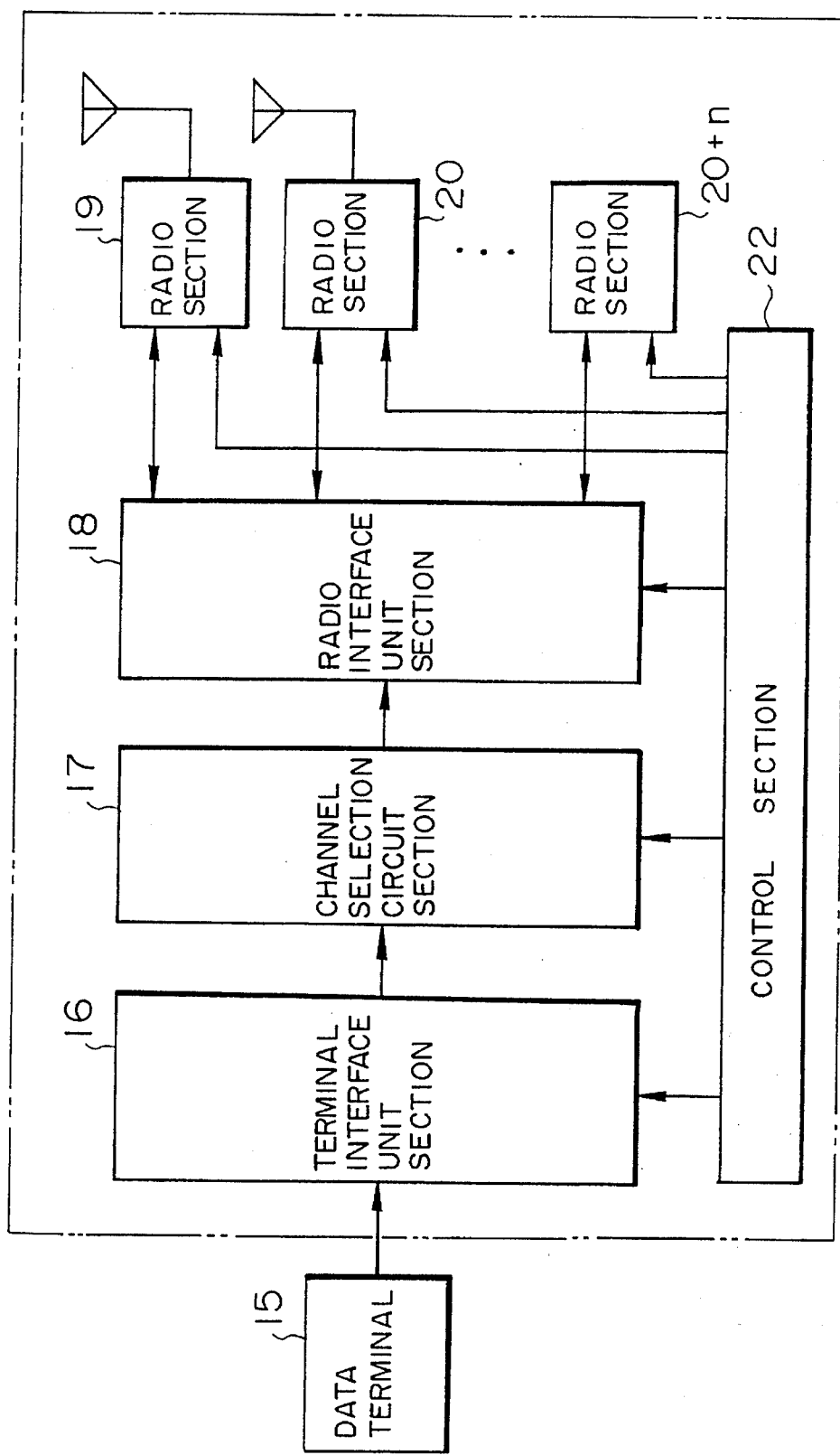
FIG. 2 is a block diagram showing a data communication system in the IC memory card type radio modem of the present invention.

FIG. 2 is a block diagram showing an arrangement of the main body section 4 of the IC memory card type radio modem 1 of the present invention. The main body section 4 will be described with reference to FIG. 2. The main body section 4 comprises a terminal interface unit section 16 connected to a data terminal 15, a channel selection circuit section 17 for selecting a channel, a radio interface unit section 18 for performing connection to a radio section 19 or the like in accordance with a selected channel, a plurality of radio sections 19, 20, . . . , 20+n connected to the radio interface unit section 18, a control section 22 for controlling each constituent block, and the like.

The arrangement and operation of the IC memory card type radio modem 1 will be described in detail next.

When the IC memory card section 3 is inserted in the IC memory card insertion portion of a portable information processing device such as a personal computer, the IC memory card type radio modem 1 is connected to the personal computer. Data output from the connected data terminal 15 is sent to the terminal interface unit section 16 and undergoes data conversion. The resultant data is then sent to the channel selection circuit section 17, the radio interface unit section 18, and the radio sections 19, 20, . . . , 20+n, from which the data is transmitted to remote units via the corresponding radio infrastructures.

When data are received by the radio section 19 and the like via the corresponding radio infrastructures, the data are input to the radio interface unit section 18. The received data are then sent to the data terminal 15 via the channel selection circuit section 17 and the terminal interface unit section 16 in correspondence with channel numbers. The data are output to the data terminal 15 in units of radio infrastructures.

As described above, the IC memory card type radio modem 1 has N radio sections 19, 20, . . . , 20+n, which are adaptable to a plurality of different radio infrastructures, and the radio interface unit section 18. If, therefore, connection to a plurality of remote units is performed through the ratio sections 19, 20, etc., of the IC memory card type radio modem 1 by using communication means such as a telephone set, the same data can be transmitted from the personal computer, to which the IC memory card type radio modem 1 is connected, to a plurality of remote units, or data can be received from a plurality of remote units. In this case, the same service providing means may be used instead of a plurality of radio infrastructures.

Figure 3:
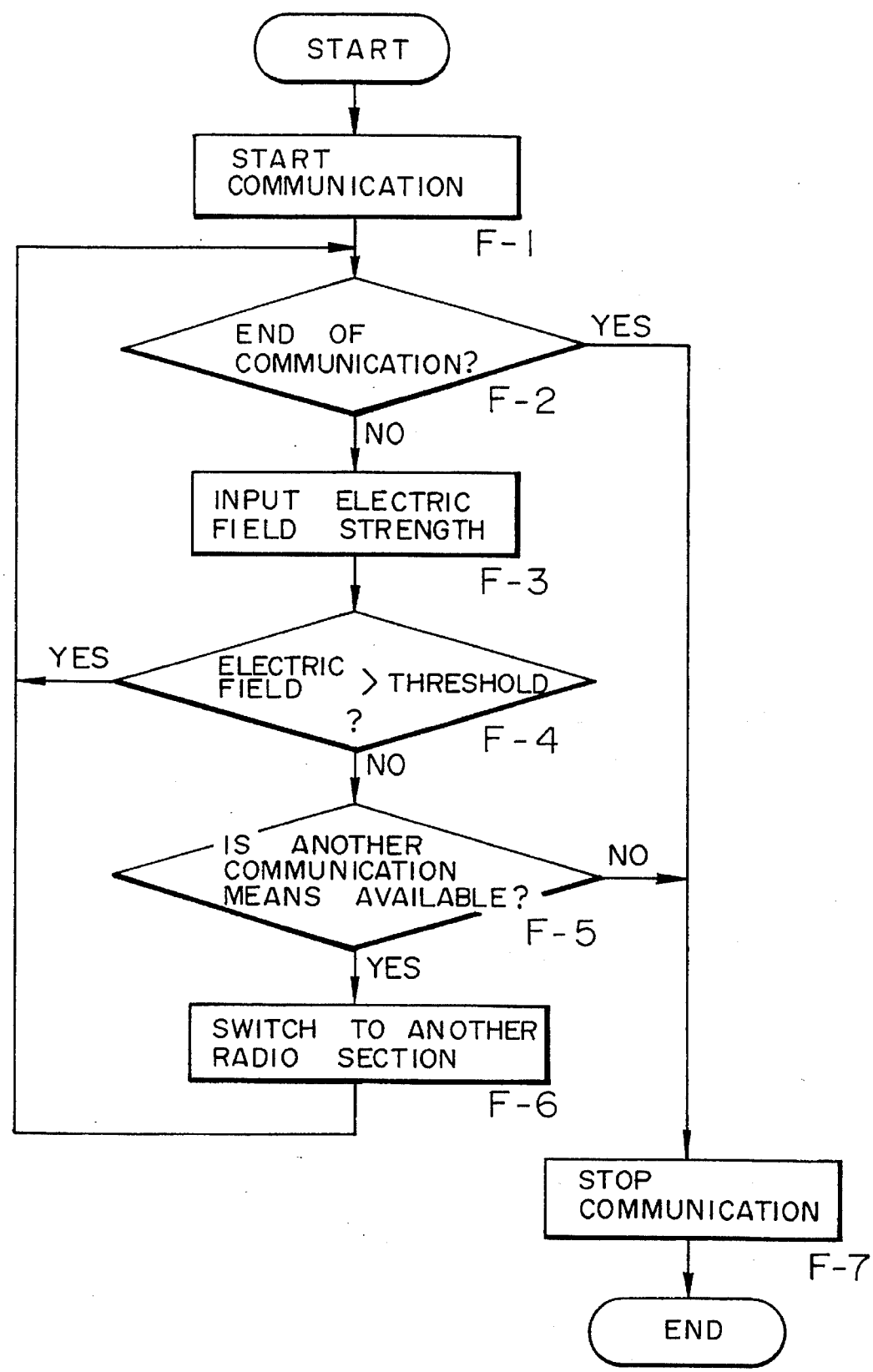
FIG. 3 is a flow chart showing the operation of the embodiment of the present invention.

An operation in the process of movement of the user of a portable information processing device such as a personal computer, to which the IC memory card type radio modem 1 of the present invention is connected, will be described next with reference to the flow chart of FIG. 3.

Communication is started by using a given communication means (step F-1), and communication with a remote unit is performed via the IC memory card type radio modem 1. Thereafter, it is checked whether the communication is completed (step F-2). If the communication is not completed, an electric field strength is detected by an electric field strength detecting section arranged in the radio section 19 or the like (step F-3). It is then checked whether the detected electric field strength exceeds a threshold (step F-4). If the electric field strength exceeds the threshold, the communication is continued.

If it is determined that the electric field strength is below the threshold, it is determined that the home or remote unit has moved outside the service area. It is then checked whether another communication means is available at the current location (step F-5). If any different service cannot be received at the current location, the communication is stopped (step F-7). If another communication means is available at the current location, e.g., the current location is in the service area of a different service company, the radio section 19 or the like is switched to another radio section (step F-6) to continue the communication by using the new communication means.

That is, when data communication is disabled because, for example, the home or remote unit has moved outside the service area in the middle of communication via the radio section 19 of the N radio sections 19, 20, . . . , 20+n of the main body section 4, switching is sequentially performed from the radio section 19 to the radio sections 20, . . . , 20+(n−1), and 20+n to search for an available radio section. If an available radio section is found, switching is performed with respect to the radio section. The data communication is continued via a radio infrastructure corresponding to the available radio section, and information indicating that the home or remote unit is outside the service area is displayed on the data terminal 15.

Figure 4:
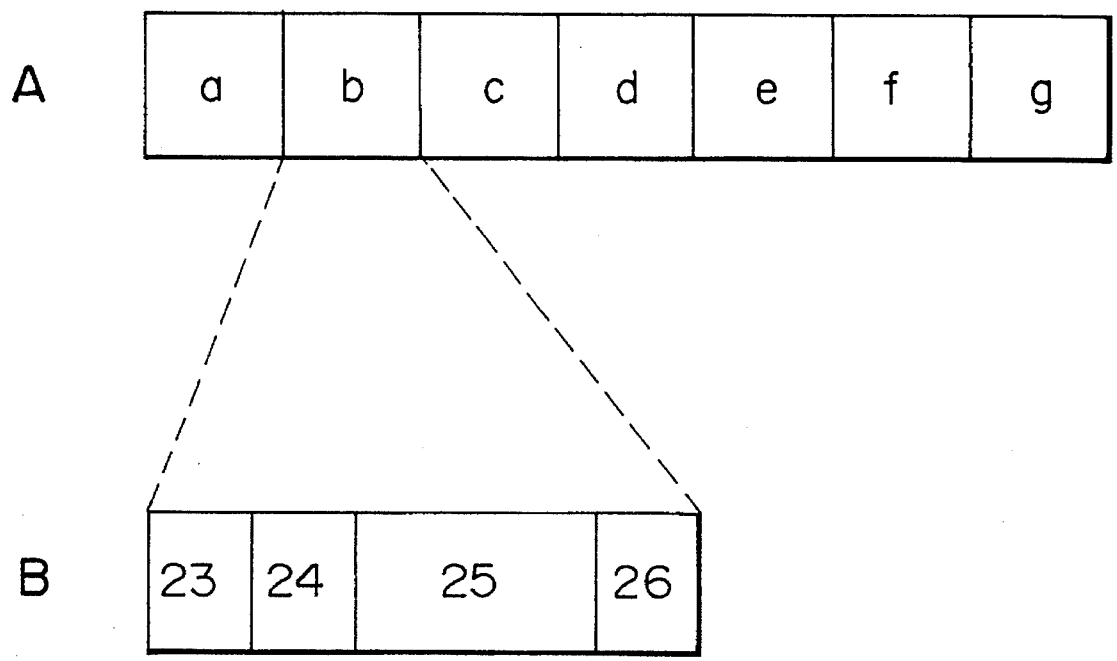
FIGS. 4 is a view for explaining the structure of a packet associated with data communication in the IC memory card type radio modem of the present invention.

FIGS. 4 shows the structure of a packet for performing communication by using a plurality of channels. This structure will be described below.

"A" of FIG. 4 shows a case wherein packet transmission/reception is performed with the abscissa representing time. In this case, by sequentially transmitting/receiving packets a, b, c, . . . , interference between signals having different frequencies from radio sections can be prevented. The order of these packets a, b, c, . . . is set as follows. The control section 22 for controlling each radio section checks the available channel information sent from operators to the radio sections 19, 20, . . . , 20+n, and arranges packets in the order in which available channels are found, thereby performing transmission/reception of the packets.

"B" of FIG. 4 shows the structure of each transmission/reception packet in "A" of FIG. 4. Each packet consists of flag bits 23, 26 respectively indicating the beginning and end of the packet, an address bit 24 indicating the address of a transmission destination/source, and a data bit 25. With this packet structure, communication can be performed by using a plurality of channels without interference.

What is claimed is:

1. An IC memory card type radio modem comprising:

a connecting portion which can be connected to a PC card portion of a portable information processing device;

a radio section adaptable to at least one type of radio infrastructure;

a radio interface unit section adapted to said radio section:

a channel selection circuit section connected to said radio interface unit section;

a terminal interface unit section to be connected to said channel selection circuit section;

a control section for controlling said plurality of radio sections, wherein said radio interface unit section is controlled to always switch to a radio infrastructure which can perform communication; and detection means for detecting a reception state of said radio section, and wherein when said detection means determines that communication cannot be continued, said radio interface unit section is controlled to switch a currently used radio infrastructure to a radio infrastructure which can perform communication.

2. An IC memory card type radio modem comprising:

a connecting portion which can be connected to a PC card portion of a portable information processing device;

a radio section adaptable to at least one type of radio infrastructure;

a radio interface unit section adapted to said radio section;

a channel selection circuit section connected to said radio interface unit section;

a terminal interface unit section to be connected to said channel selection circuit section; and a control section for controlling said plurality of radio sections, wherein said radio interface unit section is controlled to always switch to a radio infrastructure which can perform communication;

wherein simultaneous communication can be performed with respect to a plurality of addresses of said at least one type of radio infrastructure by performing simultaneous connection to a plurality of channels with respect to the plurality of addresses.

\* \* \* \* \*